(12) United States Patent  (10) Patent No.: US 8,701,111 B2
Fontenot et al.  (45) Date of Patent: Apr. 15, 2014

(54) LOCK WINDOWS FOR REDUCING CONTENTION

(75) Inventors: Nathan Fontenot, Georgetown, TX (US); Jacob L. Moilanen, Austin, TX (US); Joel H. Schopp, Austin, TX (US); Michael T. Strosaker, Austin, TX (US); Mark W. VanderWiele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1340 days.

(21) Appl. No.: 12/170,101

(22) Filed: Jul. 9, 2008

(65) Prior Publication Data

US 2010/0011360 A1   Jan. 14, 2010

(51) Int. Cl.
 *G06F 9/46* (2006.01)
(52) U.S. Cl.
 USPC .................... 718/100; 718/102; 718/104
(58) Field of Classification Search
 None
 See application file for complete search history.

(56) References Cited

U.S. PATENT DOCUMENTS

| | | | |
|---|---|---|---|
| 5,826,081 A * | 10/1998 | Zolnowsky | 718/103 |
| 6,631,009 B1 * | 10/2003 | Thomas et al. | 358/1.15 |
| 6,732,363 B1 * | 5/2004 | Chaudhry et al. | 719/318 |
| 6,779,182 B1 * | 8/2004 | Zolnowsky | 718/103 |
| 6,820,263 B1 | 11/2004 | Klappholz | |
| 6,938,131 B2 * | 8/2005 | Ogasawara | 711/151 |
| 6,965,961 B1 | 11/2005 | Scott | |
| 7,594,234 B1 * | 9/2009 | Dice | 718/108 |
| 8,166,480 B2 | 4/2012 | Fontenot et al. | |
| 2003/0037294 A1 * | 2/2003 | Robsman et al. | 714/55 |
| 2003/0061259 A1 * | 3/2003 | Heddes et al. | 709/102 |
| 2005/0081204 A1 * | 4/2005 | Schopp | 718/100 |
| 2006/0037021 A1 | 2/2006 | Anand et al. | |
| 2006/0130062 A1 * | 6/2006 | Burdick et al. | 718/100 |
| 2006/0212876 A1 | 9/2006 | Buch | |
| 2006/0277551 A1 * | 12/2006 | Accapadi et al. | 718/107 |
| 2007/0067777 A1 * | 3/2007 | Branda et al. | 718/107 |
| 2007/0124728 A1 * | 5/2007 | Rosenbluth et al. | 718/100 |
| 2008/0184238 A1 * | 7/2008 | Ruemmler | 718/102 |
| 2009/0044194 A1 * | 2/2009 | Rathi | 718/104 |
| 2009/0271789 A1 * | 10/2009 | Babich | 718/100 |
| 2009/0320030 A1 * | 12/2009 | Ogasawara | 718/102 |

FOREIGN PATENT DOCUMENTS

| | | |
|---|---|---|
| JP | 05257902 | 10/1993 |
| JP | 06259383 | 9/1994 |
| JP | 2004021985 | 1/2004 |
| JP | 2005310012 | 11/2005 |
| KR | 19996454 | 1/1999 |

OTHER PUBLICATIONS

Bijun He, et al., "Preemption Adaptivity in Time-Published Queue-Based Spin Locks," Department of Computer Science, University of Rochester, Rochester, NY 14627-0226, USA, 2005, pp. 12.

(Continued)

*Primary Examiner* — Charles Swift
(74) *Attorney, Agent, or Firm* — Kunzler Law Group (57) ABSTRACT

Methods and arrangements to assign locks to threads are discussed. Embodiments include transformations, code, state machines or other logic to assign locks to threads. Embodiments may include setting a window of time at the end of a time slice of a thread. The embodiment may also involve prohibiting the thread from acquiring a lock during the window of time, based upon determining that the thread is within the window of time and determining that the thread does not hold any locks. Other embodiments include an apparatus to assign locks to threads and a computer program product to assign locks to threads.

18 Claims, 5 Drawing Sheets

(56) References Cited

OTHER PUBLICATIONS

Engler, Dawson R "The Exokernel Operating System Architecture", Massachusetts Institute of Technology, Oct. 1998, pp. 9.

Hohmuth, Michael, "Pragmatic Nonblocking Synchronization for Real-time Systems", Proceedings of the 2001 USENIX Annual Technical Conference, 2001, pp. 15.

* cited by examiner

LOCK WINDOWS FOR REDUCING CONTENTION

BACKGROUND OF THE INVENTION

The present invention is in the field of data processing. More particularly, the present invention relates to methods and arrangements for the assignment of locks for threads.

Many computer processes consist of small, semi-independent sections called threads. The independence poses a potential problem to the correct operation of the processes. Absent mechanisms to prevent threads from simultaneously operating on data, the use of threads may lead to incorrect results. For example, a program may handle bank accounts. A thread of the program, Deposit, may handle deposits, and another, Withdrawal, may handle withdrawals.

Deposit may perform the following steps:
  obtain the old balance,
  increase the balance by the amount of the deposit, and
  store the new balance.

Similarly, Withdrawal may perform the following steps:
  obtain the old balance,
  decrease the balance by the amount of the withdrawal, and
  store the new balance.

Suppose John has an initial balance of $2,000, deposits $500, and withdraws $30. Without preventive measures, the Deposit and Withdrawal threads may operate as follows:

| transaction | amount |
| --- | --- |
| Deposit obtains old balance | $2,000 |
| Withdrawal obtains old balance | $2,000 |
| Deposit increases the balance | $2,500 (value stored in Deposit thread) |
| Deposit stores the balance | $2,500 (value stored in John's balance) |
| Withdrawal decrements the old balance | $1,970 (value stored in Withdrawal thread) |
| Withdrawal stores its balance | $1,970 (value stored in John's balance) |

In this example, the simultaneous access to the bank account by the two threads produced an incorrect balance for the account. In effect, the deposit transaction was not counted. The Withdrawal thread obtained the balance of John's account before it was incremented by the Deposit thread, calculated a new total, and stored that total after the Deposit thread had finished processing.

To prevent errors such as the above, computer programs may allow only one thread at a time to access data in certain conditions, a principle called locks. Utilizing locks in the above example, Deposit thread may acquire a lock on the bank account before obtaining the balance. Deposit may then finish processing the account, increasing the balance to $2,500. Because Deposit held the lock, Withdrawal may not have been permitted to access John's account to obtain the old balance until Deposit had completed processing. After Deposit releases the lock, Withdrawal acquires it. It may now access the account, obtain the balance of $2,500 at the start of its operations, and continue processing the account to produce the correct result of $2,470.

Threads may idle while waiting to obtain a lock held by another thread. A thread possessing a lock may time out, leaving the lock inaccessible to other threads until the thread regains a time slice, completes its processing, and releases the lock.

BRIEF SUMMARY OF THE INVENTION

The problems identified above are in large part addressed by methods and arrangements of assigning locks to threads. One embodiment provides a method of assigning locks to threads. The method may involve setting a window of time at the end of a time slice of a thread. The method may also involve prohibiting the thread from acquiring a lock during the window of time, based upon determining that the thread is within the window of time and determining that the thread does not hold any locks. Other embodiments include an apparatus to assign locks to threads and a computer program product to assign locks to threads.

BRIEF DESCRIPTION OF THE SEVERAL VIEWS OF THE DRAWINGS

Advantages of the invention will become apparent upon reading the following detailed description and upon reference to the accompanying drawings in which like references may indicate similar elements.

DETAILED DESCRIPTION OF THE INVENTION

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements of assigning locks to threads based upon windows of time are contemplated. Embodiments include transformations, code, state machines or other logic to set a window of time at the end of a time slice of a thread. Embodiments may also involve prohibiting the thread from acquiring a lock during the window of time, provided that the thread is within the window of time and the thread does not hold any locks.

In further embodiments, when a thread is started, a thread library may register an area of memory to store the starting time of the window of time. When a scheduler schedules the task, the kernel may communicate the start of the window of time to the thread library. In some cases, the start may be some small fixed amount of time before the timeslice expiration time. Whenever a lock is released during the execution of the thread, the thread library may check whether it is the only lock held by the thread. If so, the thread library may then check whether the thread is past the start of the window of time. If so, the thread may yield so that other threads may be scheduled While specific embodiments will be described below with reference to particular circuit or logic configurations, those of skill in the art will realize that embodiments of the present invention may advantageously be implemented with other substantially equivalent configurations.

Figure 1:
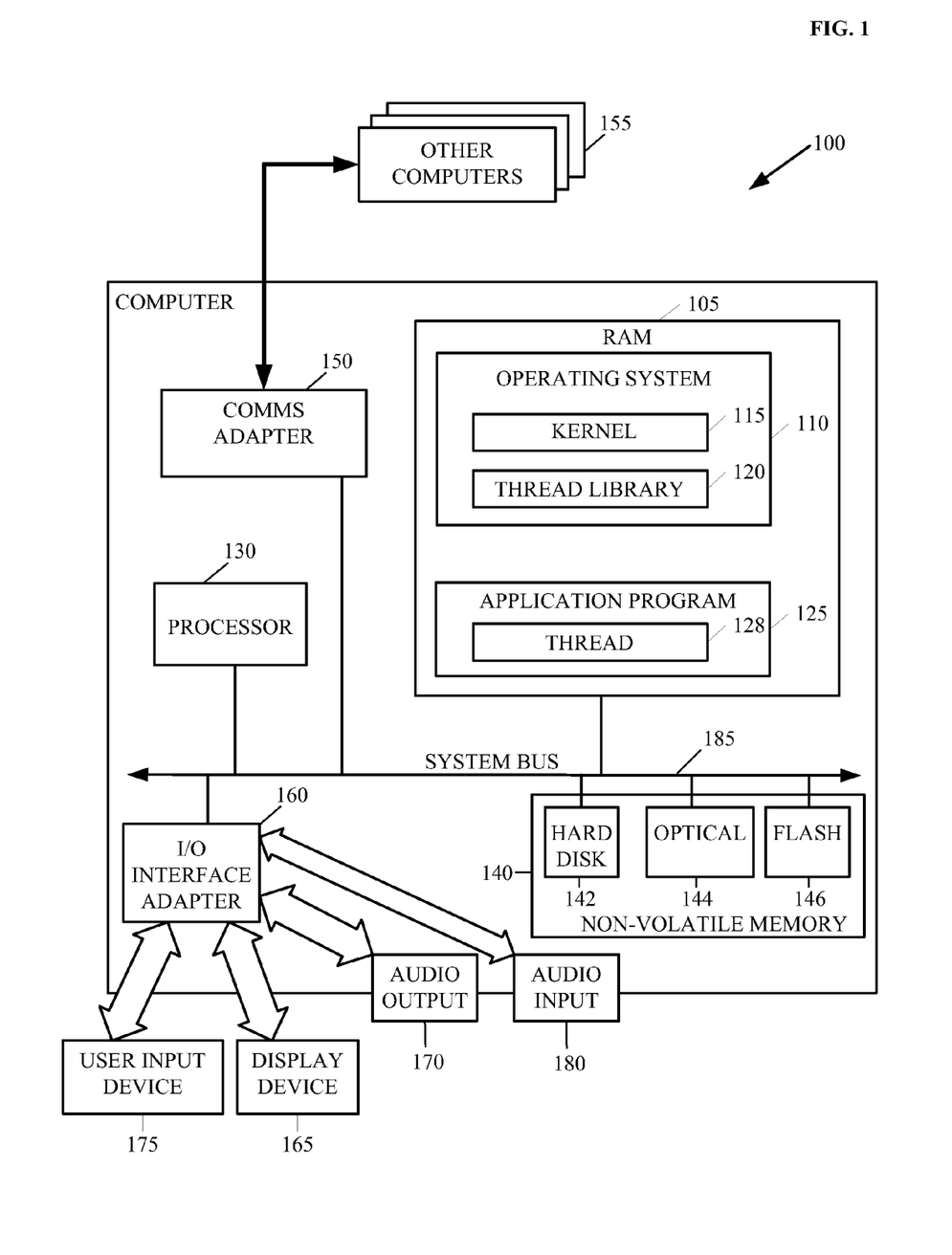
FIG. 1 depicts a computer capable of assigning locks to threads based upon windows of time.

FIG. 1 depicts an embodiment of a computer 100 capable of assigning locks to threads in accordance with embodiments of the invention that includes random access memory (RAM) 105, a processor 130 or CPU, non-volatile memory 140, a communications adapter 150, and an Input/Output (I/O) interface adapter 160 connected by system bus 185. Stored in RAM 105 is operating system 110 and application program 125. Operating system 110 is a layer of system software that may make system resources, including memory access, access to input/output resources, and access to processors, available to other programs. Operating system 110 may also control allocation and authorization for access to computer resources. Operating systems perform low-level, basic tasks, such as recognizing input from a keyboard, sending output to a display screen, keeping track of files and directories on a magnetic disk drive, and controlling peripheral devices such as disk drives and printers. The operating system is also responsible for security, ensuring that unauthorized users do not access the system Operating systems useful in assigning locks to threads include UNIX™, Linux™, Solaris™, Microsoft Windows XP™ and Vista™, AIX™, IBM's i5/OS™ and others as will occur to those of skill in the art. Operating system 110 includes kernel 115 and thread library 120.

Kernel 115 may comprise a fundamental part of operating system 110 that resides in memory and provides the basic services. Kernel 115 may be the component of operating system 110 that is closest to the hardware level of computer 100. Kernel 115 may activate the hardware directly or may interface to another software layer, which drives the hardware. In the embodiment of FIG. 1, kernel 115 may schedule threads by assigning time slice to them. Kernel 115 may also provide functions for making system resources available to threads. In some embodiments, kernel 115 may support kernel threads by providing resources for them and scheduling them on processors.

Thread library 120 may comprise routines to support user threads. A user thread is a thread created by a user application. The application, for example, may be programmed in a language that supports the creation of threads, such as Java, C, or C++. A thread is separate stream of executable computer program instructions. A thread may possess the following characteristics:

It has its own independent flow of control within a process
It shares resources with other threads within a process
It can voluntarily terminate before the process termination.

Threads may be generated by processes, independently running programs. The resources of a process may include address space, a shared library, processor registers, code segment and offset registers, data segment and offset registers, stack segment and offset registers, flag registers, instruction pointer registers, program counters, and other resources needed for execution of software programs. Processes may be organized further as threads. Multiple user threads can exist within a process and use these process resources, yet are able to be scheduled by the operating system and run as independent entities within a process. A user thread can posses an independent flow of control and can be scheduled because it maintains its own resources. While threads of a process may possess separate registers and stacks, they may share the same memory space and may be capable of reading and writing to the same memory addresses.

Thread library 120 may administer the running of threads, including the assignment of locks to user threads. In many embodiments, thread library 120 may provide resources to the user threads by mapping them to kernel threads. Thread libraries useful for assigning locks to threads include POSIX Pthreads, Win32 threads, and Java threads.

Application program 125 may comprise computer program instructions for performing a computer application. A process created by running the program may create user thread 128. Thread library 120 may supervisor the execution of user thread 128, and may map user thread 128 to a thread of kernel 115.

Operating system 110 and application program 125 (components of software) are shown in RAM 105 in FIG. 1, but many components of such software may be stored in non-volatile memory 140 also. Further, while the components of such are shown simultaneously present in RAM, in some other embodiments, only some of the components of RAM 105 may be present at any given time.

Non-volatile computer memory 140 may be implemented as a hard disk drive 142, optical disk drive 144, electrically erasable programmable read-only memory space (EEPROM or Flash memory) 146, RAM drives (not shown), or as any other kind of computer memory as will occur to those of skill in the art. Communications adapter 150 may implement the hardware level of data communications through which one computer sends data communications to other computers, such as other computers 155, directly or through a network. Such data communications may be carried out serially through RS-132 connections, through external buses such as USB, through data communications networks such as IP networks, and in other ways as will occur to those of skill in the art. Examples of communications adapters include modems for wired dial-up communications, Ethernet (IEEE 802.3) adapters for wired network communications, 802.11a/b/g/n adapters for wireless network communications, and mobile broadband cards.

I/O interface adapter 160 implements user-oriented I/O through, for example, software drivers and computer hardware for controlling output to display devices such as display device 165 and audio output device 170 as well as user input from user input device 175 and audio input device 180. User input device 175 may include both a keyboard and a mouse. Some embodiments may include other user input devices such as speech interpreters, bar code scanners, text scanners, tablets, touch screens, and/or other forms of user input devices. Audio output 170 may include speakers or headphones and audio input device 180 may include a microphone or other device to capture sound.

The computer and components illustrated in FIG. 1 are for explanation, not for limitation. In other embodiments, embedded systems, PDAs, cell phones, BlackBerries® and other devices may assign locks to threads. In other embodiments, modules to assign locks to threads may be implemented in hardware, firmware, or in state machines or may form a component of an operating system. In several embodiments, a computing device may contain two or more processors. In various embodiments, a computing device may use point-to-point interconnects to connect processors or to connect a processor and another element of the computing system.

Figure 2:
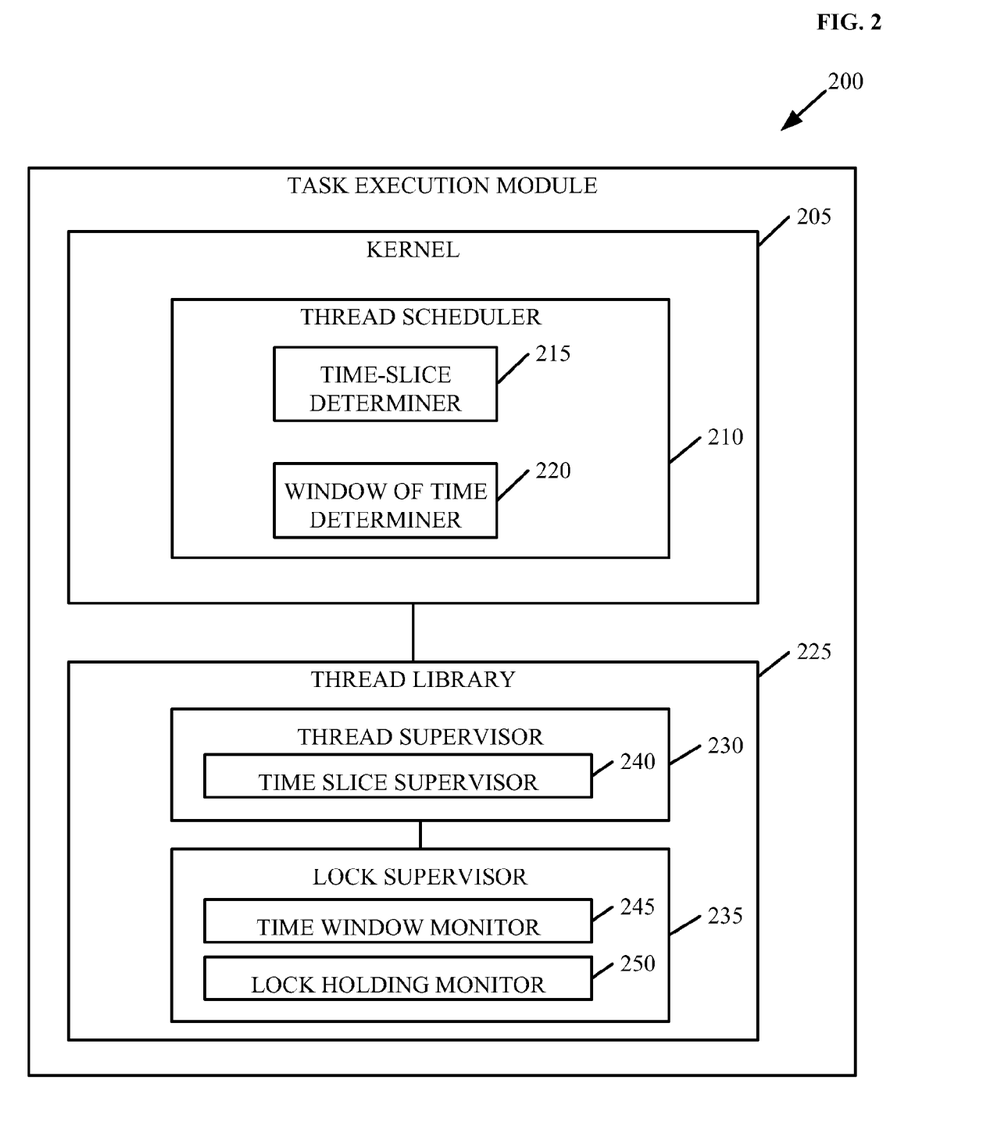
FIG. 2 depicts an apparatus to assign locks to threads based upon windows of time.

Turning to FIG. 2, illustrated is an embodiment of a task execution module 200 to assign locks to threads. A lock is a construction to prevent two or more threads from corrupting data by operating on the data simultaneously. Locks are useful, because separate threads may be capable of reading and writing to the same memory addresses. A mechanism to prevent data corruption is called 'mutual exclusion' or 'mutex.' In mutual exclusions, portions of code where shared data are read or modified are defined as 'critical sections,' and some mechanism is implemented to guarantee that two threads will never be in a critical section for the same shared data at the same time. A mechanism that guarantees that two threads will never be in a critical section for the same shared data at the same time is referred to in this specification as a 'lock.' Examples of locks include UNIX semaphores, monitor classes in C++, and synchronized methods in Java. A thread that requests exclusive access to a critical section for shared data is said to request a lock. A thread that has exclusive access to a critical section for shared data is said to hold the lock. Requesting a lock is typically implemented with a system call which, if the lock is not immediately available, places the requesting thread in wait state until the lock becomes available. In some cases, the waiting time may be increased because the thread holding a lock may time out. The waiting threads may not acquire the lock until the thread holding the lock regains a timeslice and finishes its critical section involving the lock.

Task execution module 200 includes kernel 205 and thread library 225. Kernel 205 includes a thread schedule 210. Thread scheduler 210 may schedule threads. In some embodiments, kernel 205 may create kernel threads and thread scheduler 210 may schedule them. In further embodiments, user threads may be scheduled by mapping them to kernel threads.

Thread scheduler 210 includes time-slice determiner 215 and window of time determiner 220. Time-slice determiner 215 may determine time slices for threads. In one form of scheduling, a thread is given a time slice or quantum of time to execute on a processor. When the time slice expires, the thread is put into a wait state until its next time slice is scheduled. In some embodiments, threads may be assigned priorities. A thread with higher priority may have be given a large time-slice. In other embodiments, waiting threads may be placed into queues. Threads may be initially assigned to a queue with a smaller time slice. If the thread cannot complete its task after several time slices, it may be assigned to a queue with a higher time slice.

Window of time determiner 220 may determine a window of time ending at the conclusion of a thread's time slice in which the thread is prohibited from acquiring a lock, provided that the thread does not hold any locks. In some embodiments, the window of time may comprise a fixed percentage of the time slice of the thread, such as 10%. For example, if the thread is allocated a time slice of 100 ms, window of time determiner may assign a window of the last 10 ms of the time slice. In a few embodiments, the window of time may be a fixed amount, such as 8 ms. In some embodiments, the determination of the window of time may be tunable. A system administrator may be able to set a parameter which determines the duration of windows of time. In several embodiments, a module such as lock supervisor 235 may monitor the waiting time for locks, and may increase the window of time in conditions of increased waiting for locks. Conversely, lock supervisor 235 may decrease the window of time in conditions of decreased waiting for locks. In some further embodiments, the tuning may occur during an initial period. Once tuned, the sizes of the window of time may remain fixed. In other further embodiments, the sizes of the windows of time may be frequently updated dependent upon conditions.

Thread library 225 may contain routines to support the execution of user threads. Thread library 225 includes thread supervisor 230 and lock supervisor 235. Thread supervisor 230 may supervisor the creation, deletion, and assignment of resources to user threads. Thread supervisor 230 may perform a portion of its functions by mapping user threads to kernel threads. These user threads may have access to the resources provided to the kernel threads by kernel 205. Thread supervisor 230 includes time slice monitor 240. Time slice supervisor 240 may administer the time slices of a thread. Time slice supervisor 240 may receive an allotment of a time slice for a thread from kernel 205. When the thread has completed its time slice, time slice supervisor 240 may place the thread in a waiting state. In addition, in some embodiments, time slice supervisor 240 may time out a thread to prevent the thread from acquiring a lock during its window of time at the expiration of a time slice, when the thread does not hold a lock.

Lock supervisor 235 may administer locks to threads. Lock supervisor 235 includes time window monitor 245 and lock holding monitor 250. Time window monitor 245 may monitor an executing thread's window of time at the end of the thread's time slice. Time window monitor 245 may reserve storage space to hold the start of the window of time or other information from which the start of the window of time may be calculated. In many embodiments, the storage space may be memory in RAM, such as RAM 105 of FIG. 1. In other embodiments, the storage space may be space in a register. When a thread begins execution, time window monitor 245 may store the start time or other information in the registered space. Lock holding monitor 250 may monitor the number of locks held by threads.

Lock supervisor 235 may make decisions on whether to grant locks to the thread based on data provided by time window monitor 245 and lock holding monitor 250. It may prohibit threads from acquiring locks within their windows of time when the locks do not hold any threads. In some embodiments, lock supervisor 235 may check a thread when it releases a lock. If it is within its window of time and does not hold any locks, lock supervisor 235 may send a message to thread supervisor 230 to time out the thread, to prevent it from obtaining a lock in the remainder of its time slice. In other embodiments, lock supervisor 235 may deny a request for a lock made by a thread within its window of time when the thread does not hold any locks.

FIG. 2 is for illustration and not limitation. Some embodiments of a type-ahead module may omit some of the feature shown and many embodiments may include additional features. Similarly, in other embodiments of a task-execution module, the division of functionality between modules may differ from the division shown in FIG. 2. Functions of several modules may be combined in one module, or functions of one module may be split among several.

Figure 3:
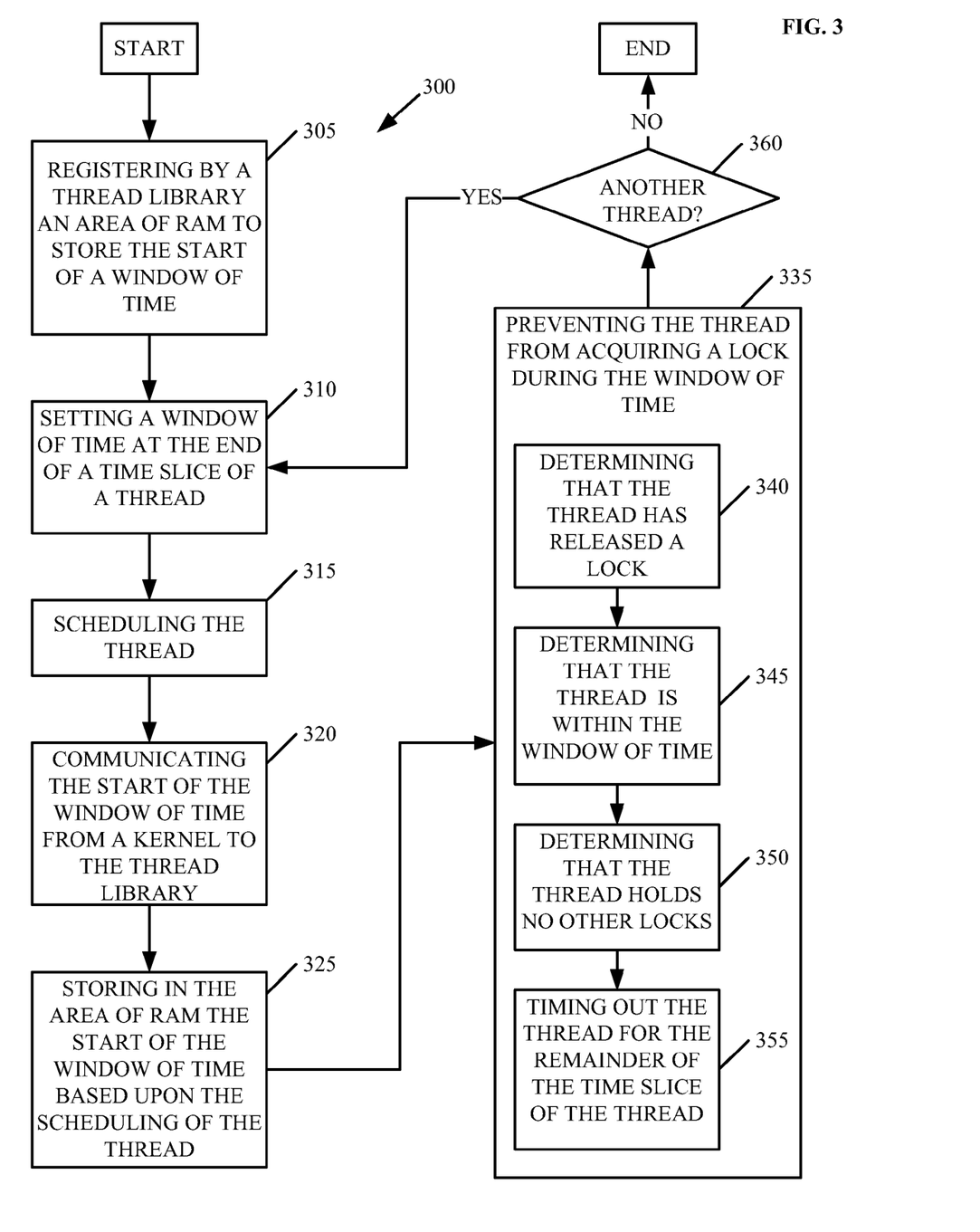
FIG. 3 sets forth a flowchart of a method to assign locks to threads based upon windows of time.

FIG. 3 depicts a flowchart of an embodiment of a method to grant locks to threads. The method may be performed by an apparatus such as task execution module 200 of FIG. 2. Flowchart 300 of FIG. 3 begins with registering by a thread library an area of RAM to store the start of a window of time (element 305). The method includes setting a window of time at the end of a time slice of a thread (element 310). The method also includes scheduling the thread (element 315). The scheduling of the thread may determine when the thread obtains its next time slice on a processor. From the scheduled end of the time slice and the size of the window of time, the start of the window of time may be determined. The kernel may communicate to the thread library the start of the window of time or other information from which the start may be determined (element 320). The thread library may store the start time or other information in the area of RAM registered for storing the start information (element 325).

The information about the window of time may be used to prevent the thread from obtaining a lock during its window of time, provided that the thread does not hold other locks (element 335). In many embodiments, preventing the thread from obtaining the lock may include determining that the thread has released a lock (element 340). A module such as lock supervisor 235 of FIG. 2 may monitor the acquisition and release of locks by threads. The method may include determining that the thread is within the window of time (element 345). The method may also include determining that the thread holds no other locks (element 350). Based upon the above three determinations, the thread may then be timed out for the remainder of the time slice of the thread (element 355). If there are other threads to monitor, elements 310 through 335 may be repeated (element 360). Otherwise, the method of FIG. 3 may end.

The method of FIG. 3 is for illustration and not for limitation. In other embodiments, elements may be performed in a different order, additional elements may be performed, or some elements may be deleted. In some embodiments, a register may be used to store the start of a window of time for a thread. In a few embodiments, a thread may be permitted to continue running after releasing its last lock during its window of time. Instead, in some further embodiments, lock requests of the thread may be checked. If the thread makes a request during its window of time and it doesn't hold any locks, the request may be denied. In some embodiments, a thread supervisor may check whether a thread holds any locks at the start of its window of time. If the thread does not hold locks, the thread may be timed out.

Some embodiments of FIG. 3 may speed the running time of applications such as application 125 of FIG. 1 by reducing the waiting time for locks whose holders have timed out. This waiting time may be considerable. Other threads wishing to access the data protected by the lock may have to wait until the thread has regained a processor and completed its processing involving the lock. The thread may only regain a time slice after several other threads complete their time slices.

In these embodiments, preventing threads from gaining locks during their windows of time at the end of time slices may decrease the chances that the threads time out holding the locks. These embodiments may be especially effective for threads that repeatedly reacquire locks after using them. For example, a Withdrawal thread such as the thread mentioned in the Background section may repeatedly acquire a lock on an account, update the account, and release the lock. When these threads release a lock during their window of time, they may acquire another lock shortly afterwards and be unable to finish the processing before timing out. Under the method of FIG. 3, these threads would not be able to acquire the locks and would not delay the other threads. Although some embodiments of the invention may reduce lock contention, this result is not a limitation of the invention. Other embodiments of the invention may use windows of time for locks for other purposes as may occur to those of skill in the art.

Figure 4:
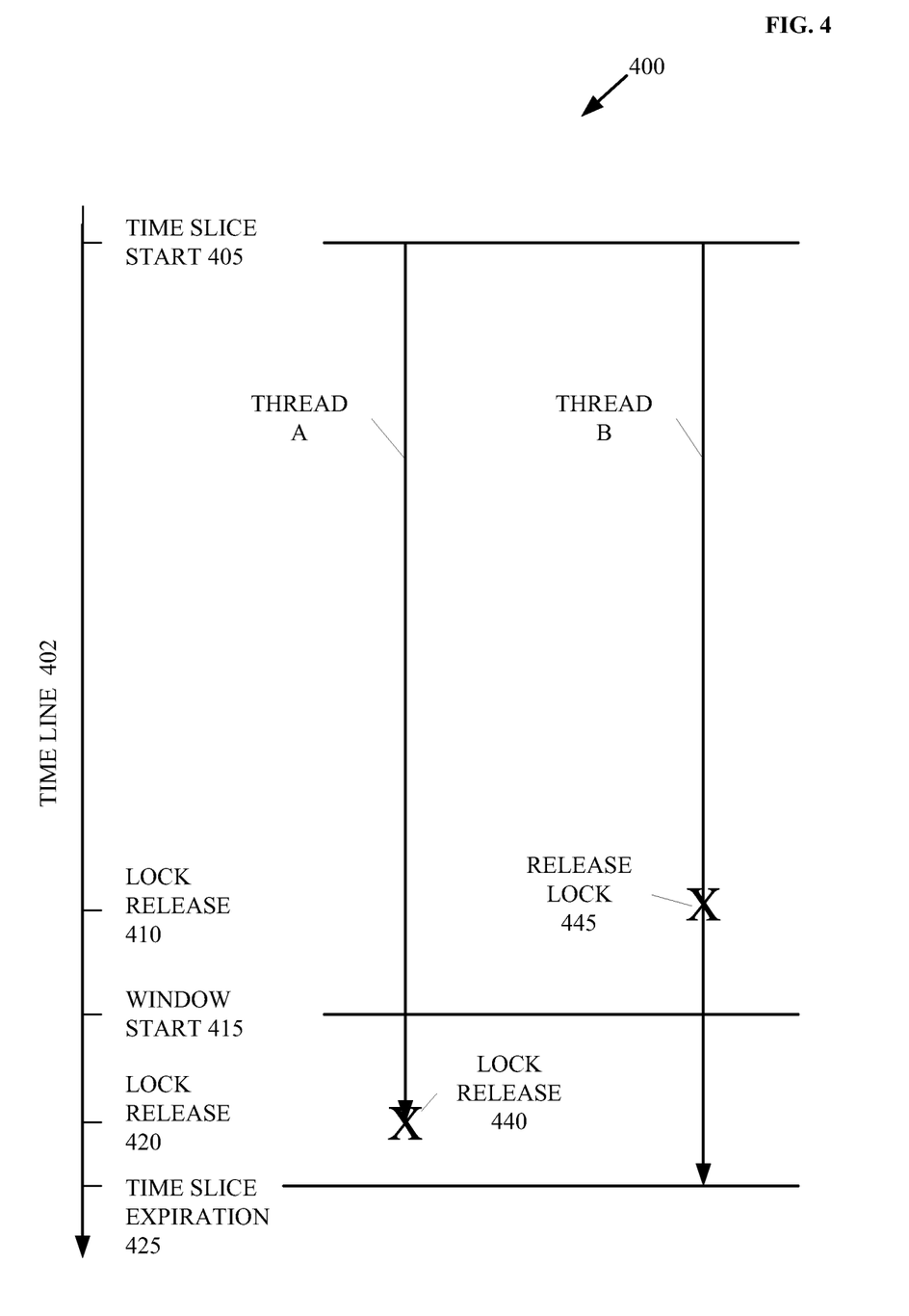
FIG. 4 sets forth a time line illustrating the assignment of locks to threads based upon windows of time.

FIG. 4 is an example of a time diagram 400 depicting a detailed description of element 335. The diagram of FIG. 4 includes a time line 402 depicting two executing threads, thread A and thread B. In the example of FIG. 4, the time slice of each thread begins at time 405, the window of time of each thread begins at time 415, and the regularly scheduled end of the time slice occurs at time 425. At time 410, thread B releases a lock (element 445). The release is before the start 415 of the window of time of thread B. Accordingly, thread B continues executing, in this case for the remainder of its time slice. In contrast, thread A releases a lock (element 440) at time 420, within the window of time of thread A. In the example of FIG. 4, thread A may not hold any locks after it releases the lock. Thread A is then time sliced out. Its execution during the time slice ends at time 420.

Figure 5A:
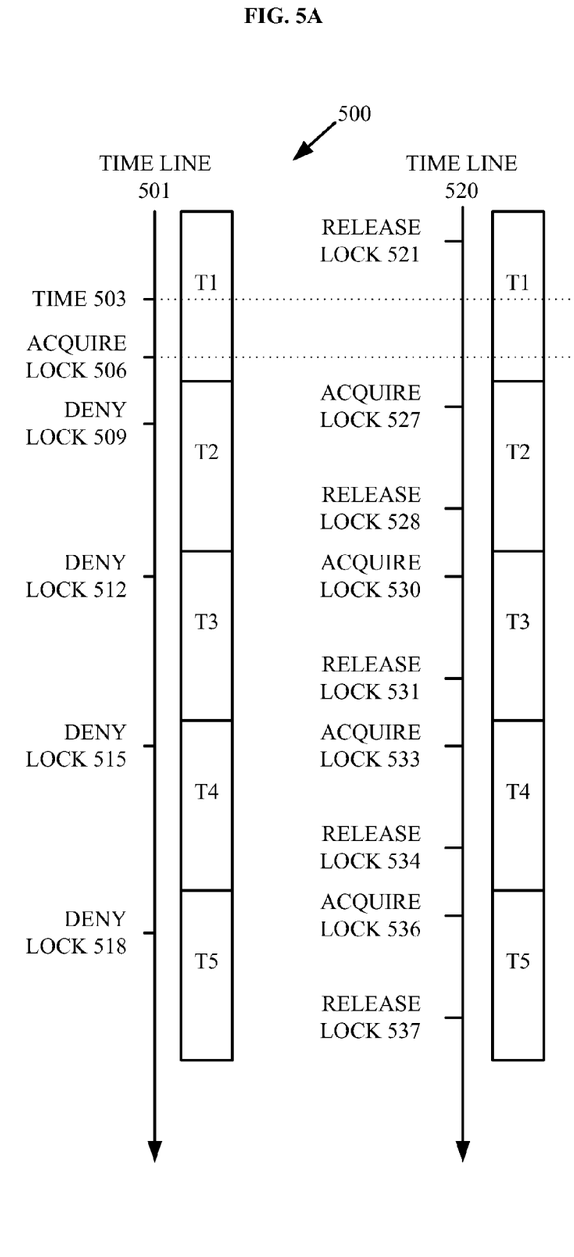
FIG. 5A sets forth a time line illustrating the assignment of locks to threads.
Figure 5B:
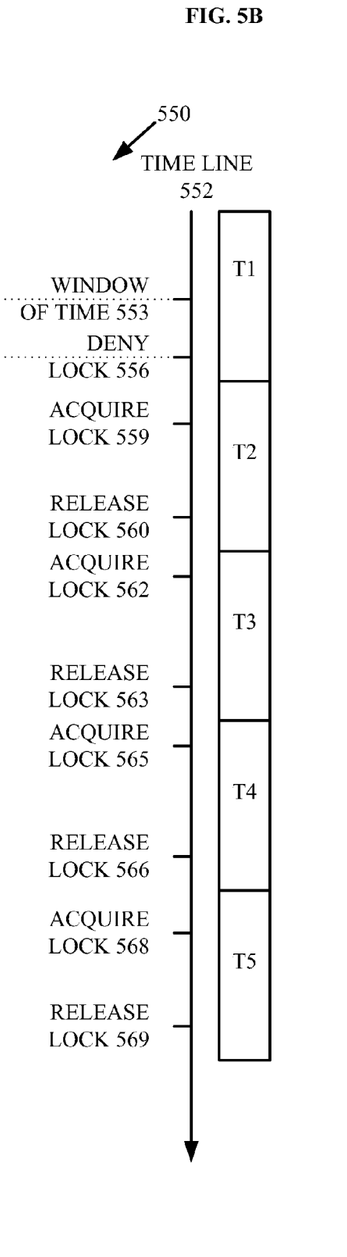
FIG. 5B sets forth an additional time line illustrating the assignment of locks to threads based upon windows of time.

Turning to FIGS. 5A and 5B, depicted are examples of time lines to illustrate the hypothetical reduction of time spent waiting for locks in an embodiment of the invention. FIGS. 5A and 5B examine the same threads under different operating environments. FIG. 5A may illustrate the operation of the threads in an environment that does not use windows of time to prevent threads from acquiring locks, and FIG. 5B may illustrate a method of assigning locks in accordance with an embodiment of the invention. FIGS. 5A and FIG. 5B include time lines (501, 520 and 552) depicting the timing of events related to the time slices of five threads (T1, T2, T3, T4, and T5).

In FIG. 5A, time 503 corresponds to time 553, the start of the window of time for thread 1 in FIG. 5B. In FIG. 5A, however, windows of time are not used. At time 506, thread T1 is allowed to acquire a lock. In the example of FIG. 5A, thread T1 holds no other locks. The time slice of T1 expires with T1 still holding the lock. At times 509, 512, 515, and 518, threads T2, T3, T4, and T5 request the lock, but the requests are denied because thread T1 still holds the lock.

Time line 520 of FIG. 5A is a continuation of time line 501. Time line 501 begins with thread T1 again active in a time slice. At time 521, T1 completes its processing involving data secured by a lock and releases the lock. Subsequently, threads T2, T3, T4, and T5 become active, acquiring time slices, and gain possession of the lock at times 527, 530, 533, and 536. Each thread completes its processing with respect to the data secured by the lock, and releases the lock during its time slice, at times 528, 531, 534, and 537 respectively. In the example of FIG. 5A, thread T1's acquisition of the lock shortly before the termination of its time slice delayed threads T2, T3, T4 and T5. They could not perform their tasks until thread T1 gained a time slice and completed its processing.

In FIG. 5B, time line 552 begins similarly to time line 501. Thread T1 begins a time slice and its window of time begins at time 553. At time 556, corresponding to time 506 of FIG. 5A, thread T1, not holding any locks, requests the lock. In the example of FIG. 5B, however, the request is denied, and T1 does not hold the lock. As a result, threads T2, T3, T4, and T5 are able to acquire the lock at times 559, 562, 565, and 568, respectively. These times correspond to times 509, 512, 515, and 518 of time line 501 of FIG. 5A. Each thread completes its processing of the data secured by the lock within the time slice and releases the lock during the time slice, at times 560, 563, 566, and 569. As a result, in FIG. 5B, only one thread, T1, undergoes a delay in processing because it does not possess a needed lock. Further, the delay may be of short duration. As seen in FIG. 5A, under the circumstances, thread T1 may have been unable to complete its processing involving the lock during the current time slice, and may have to wait until its next time slice.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements for assigning locks to threads. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of assigning locks to threads, the method comprising:
    setting a window of time at the end of a time slice of a non-suspended thread, the time slice including a scheduled end and the window of time including a period of time that starts before the scheduled end of the time slice;
    determining that the thread has requested a lock within the window of time;
    prohibiting the thread from acquiring a lock during the window of time, based upon determining that the thread is within the window of time and determining that the thread does not hold any locks; and
    timing out the thread for the remainder of the time slice of the thread.

2. The method of claim 1, further comprising:
    registering an area of memory to store the start of the window of time; and
    storing in the area of memory the start of the window of time based upon the scheduling of the thread.

3. The method of claim 2, wherein the allocating is allocating an area of memory in RAM.

4. The method of claim 2, wherein the allocating is allocating an area of memory in a register.

5. The method of claim 1, wherein the setting comprises tuning the duration of the window of time.

6. A method of assigning locks to threads, the method comprising:
    setting a window of time at the end of a time slice of a non-suspended thread, the time slice including a scheduled end and the window of time including a start time, wherein the start time of the window of time is determined based at least in part on the size of the window of time and the scheduled end of the time slice;
    determining that the thread has released a lock within the window of time;
    determining that the thread holds no other locks; and
    prohibiting the thread from acquiring a lock during the window of time and timing out the thread for the remainder of the time slice of the thread, based upon determining that the thread is within the window of time, determining that the thread has requested a lock within the window of time and determining that the thread does not hold any locks.

7. The method of claim 6, wherein:
    the method further comprises:
    registering by a thread library an area of memory to store the start of the window of time;
    scheduling the thread;
    communicating by a kernel to the thread library the start of the window of time; and
    storing in the area of memory the start of the window of time; and
    determining that the thread has released a lock within the window of time and determining that the thread holds no other locks comprise determining by the thread library that the thread has released a lock within the window of time and determining by the thread library that the thread holds no other locks.

8. The method of claim 6, wherein the setting comprises selecting a percentage and multiplying the time slice of the thread by the percentage.

9. An apparatus to assign locks to threads, the apparatus comprising:
    a window of time determiner to set a window of time at the end of a time slice of a non-suspended thread, the time slice including a scheduled end and the window of time including a period of time that starts before the scheduled end of the time slice; and
    a lock supervisor to prohibit the thread from acquiring a lock during the window of time and to time out the thread for the remainder of the time slice of the thread, based upon determining that the thread is within the window of time and determining that the thread does not hold any locks and determining that the thread has requested a lock within the window of time.

10. The apparatus of claim 9, wherein the apparatus further comprises a thread scheduler, and the apparatus is to register an area of memory to store the start of the window of time, and to store in the area of memory the start of the window of time based upon the scheduling of the thread.

11. The apparatus of claim 9, wherein:
    the lock supervisor is to determine that the thread has released a lock within the window of time and that the thread holds no other locks; and
    the apparatus is to time out the thread for the remainder of the time slice of the thread.

12. A computer program product for assigning locks to threads, the computer program product comprising a non-transitory computer useable medium having a computer usable program code embodied therewith, the computer usable program code comprising:
    computer usable program code configured to set a window of time at the end of a time slice of a non-suspended thread, the time slice including a scheduled end and the window of time including a period of time that starts before the scheduled end of the time slice; and
    computer usable program code configured to prohibit the thread from acquiring a lock during the window of time and to time out the thread for the remainder of the time slice of the thread, based upon determining that the thread is within the window of time, determining that the thread does not hold any locks and determining that the thread has requested a lock within the window of time.

13. The computer program product of claim 12, the computer usable program code further comprising:
    computer usable program code configured to register an area of memory to store the start of the window of time; and
    computer usable program code configured to store in the area of memory the start of the window of time based upon the scheduling of the thread.

14. The computer program product of claim 12, wherein the computer usable program code configured to allocate comprises computer usable program code configured to allocate an area of memory in RAM.

15. The computer program product of claim 12, wherein the computer usable program code configured to allocate comprises computer usable program code configured to allocate an area of memory in a register.

16. The computer program product of claim 12, wherein the computer usable program code configured to prohibit and to determine the thread does not hold any locks comprise comprises:
   computer usable program code configured to determine that the thread has released a lock within the window of time.

17. The computer program product of claim 12, wherein the computer usable program code configured to set a window of time comprises computer usable program code configured to selecting a percentage and to multiply the time slice by the percentage.

18. The computer program product of claim 12, wherein the computer usable program code configured to set a window of time comprises computer usable program code configured to tune the duration of the window of time.

* * * * *